(No Model.)

A. BODENSTEIN.
BED ROOM PAIL.

No. 461,255. Patented Oct. 13, 1891.

WITNESSES
J.B. McGirr.
H. M. Heaton.

Antoinette Bodenstein,
INVENTOR
by Wm Moore
Attorney

UNITED STATES PATENT OFFICE.

ANTOINETTE BODENSTEIN, OF STAATSBURG, NEW YORK.

BEDROOM-PAIL.

SPECIFICATION forming part of Letters Patent No. 461,255, dated October 13, 1891.

Application filed May 25, 1891. Serial No. 394,003. (No model.)

*To all whom it may concern:*

Be it known that I, ANTOINETTE BODENSTEIN, a citizen of the United States, residing at Staatsburg, in the county of Dutchess and State of New York, have invented certain new and useful Improvements in Bedroom-Pails; and I do declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in chamber or bedroom pails, generally known as "slop-buckets;" and the leading object of my invention is the provision of a pail of this description having a lid or cover formed with a receptacle or vessel for containing water for cleansing the pail and for other purposes.

Another object of my invention is the provision of a pail having a reservoir or chambered cover which will snugly fit the pail and prevent the exit of odors from the pail, which will not increase the size of the pail to render the same unhandy, and which will add comparatively nothing to the cost of the pail, thereby producing a pail which will be superior in every respect to the pails in common use.

To attain the desired objects the invention consists of a chamber-pail having a cover formed with a vessel for containing water for cleansing purposes, and also in certain features of construction, substantially as herein illustrated, described, and claimed.

Figure 1:
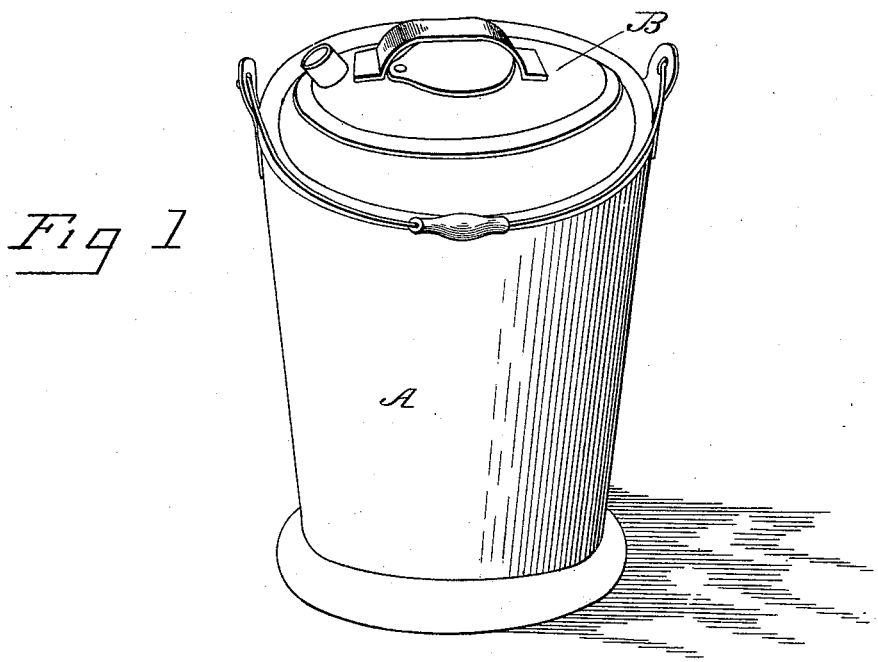
Figure 2:
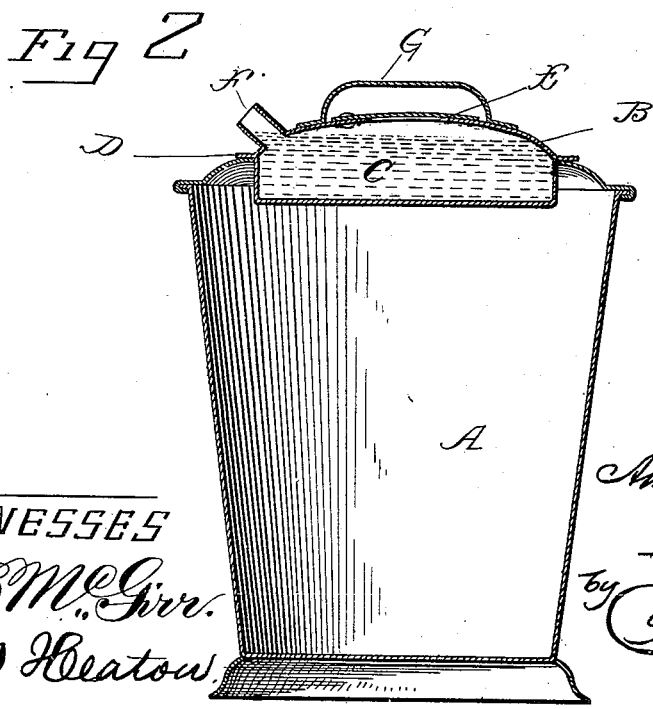

Figure 1 represents a perspective view of my improved chamber or bedroom pail, and Fig. 2 represents a vertical central sectional view thereof.

In the drawings, A designates the pail proper, and B designates the cover thereof.

The pail may be of the usual shape and of any desired size, and the cover is formed with the chamber or vessel C, the lower portion of which fits snugly in the mouth of the pail, and the flange D thereon rests on the pail, as shown. The cover is also provided with an opening E, for filling the chamber, a spout F for discharging the water, and a handle or bail G, to permit of easy handling of the cover. From this construction it is evident that the cover will contain sufficient water for cleansing purposes, and can be easily used and forms a perfect cover for the pail. It will also be seen that the pail can be produced at a low price, and possesses all the features of merit calculated to commend it to persons wishing a handy and useful article of this character.

I claim as my invention—

A chamber or bedroom pail consisting of a pail proper, a cover fitting the pail and formed with a chamber depending from the rim of the cover, a filling-opening on the upper side of the cover, a bail on said cover, and a discharge-spout near one side of the cover, as described.

In testimony whereof I affix my signature in presence of two witnesses.

ANTOINETTE BODENSTEIN.

Witnesses:
HENRY BODENSTEIN,
FRED. BODENSTEIN.